July 18, 1967  W. W. SCHWARZ ETAL  3,331,242
STRAIN ENDURANCE TEST FIXTURE
Filed Sept. 15, 1964
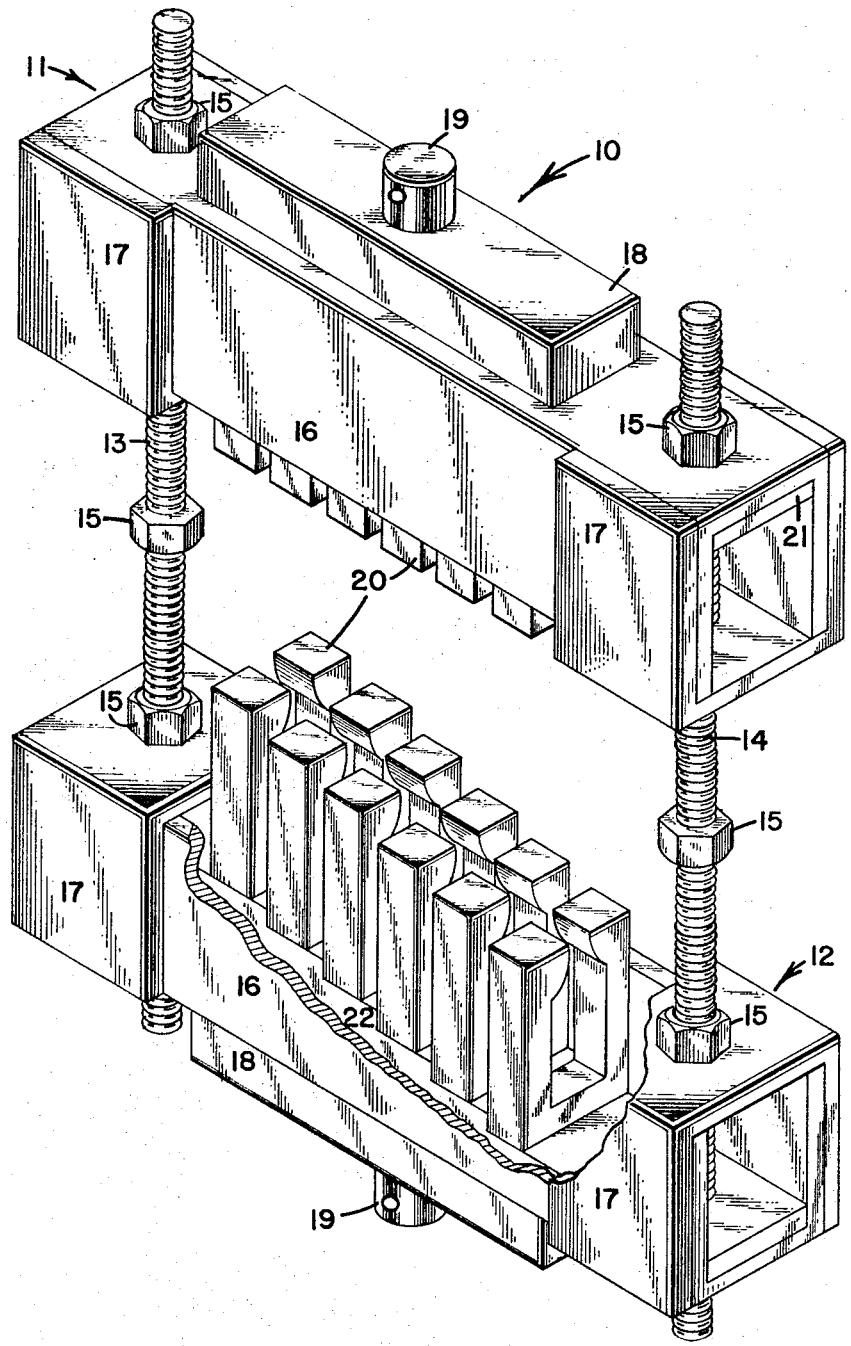
William W. Schwarz
Joseph W. Monroe   INVENTORS
BY
ATTORNEY

United States Patent Office 3,331,242
Patented July 18, 1967

3,331,242
STRAIN ENDURANCE TEST FIXTURE
William W. Schwarz and Joseph W. Monroe, Huntsville, Ala., assignors to Thiokol Chemical Corporation, Bristol, Pa., a corporation of Delaware
Filed Sept. 15, 1964, Ser. No. 396,585
1 Claim. (Cl. 73—103)

This invention relates to the testing of elastomeric materials and, more particularly, to a device for use in strain endurance testing of elastomeric materials.

An important characteristic of any elastomeric material is its strain endurance or ability to withstand sustained elongation without failure. An elastomeric specimen held at constant strain or elongation will not fail so long as that elongation does not exceed the strain endurance limit of the material. Any sustained elongation beyond this limit will result in eventual failure. The time that an elastomeric specimen will resist failure above the strain endurance limit will depend, in part, upon how greatly the limit is exceeded. Elongation greatly in excess of the limit will result in rapid failure. A specimen strained just beyond the limit, however, may not fail until a considerable time has passed.

In determining the strain endurance limit of a particular elastomeric material, a series of test specimens are individually elongated to several incrementally differing elongations and are held at these elongations until failure occurs or it is apparent that the specimen(s) will not fail. Since the strain endurance of an elastomeric material is temperature dependent, the strain endurance limit being lower at low temperatures, repetitive series of tests must be run at several temperatures. Such repetitive tests at several temperatures and elongations will obviously be quite time-consuming and/or will require a large number of test devices.

It is, therefore, an object of the present invention to provide a strain endurance test fixture whereby the strain endurance limit of an elastomeric material may be more rapidly and easily determined through the simultaneous testing of a plurality of elastomeric test specimens at incrementally differing elongations.

It is a further object of the present invention to provide a test fixture wherein a plurality of elastomeric specimens may be simultaneously elongated to and subsequently held at incrementally differing elongations while the temperature is reduced so that the strain endurance limit of the elastomeric material under conditions of lowering temperature may be determined.

These and other objects of the present invention will become apparent in the light of the subsequent description of the construction and mode of operation of one embodiment of the invention.

Reference to the single figure, which depicts in a partially sectioned oblique view a preferred embodiment of the strain endurance test fixture, should make clear its construction.

In the figure, 10 generally designates a strain endurance test fixture, comprising an upper specimen holder assembly 11 and a lower specimen holder assembly 12 slidably mounted upon a pair of threaded guide rods 13 and 14 carrying locking nuts 15 for locking the guide rods 13 and 14 to the specimen holder assemblies 11 and 12 by contact with their upper and lower surfaces respectively. The lowermost pair of locking nuts 15, bearing against the lower surface of the lower specimen holder assembly 12, is hidden from view.

The upper and lower specimen holder assemblies 11 and 12 are identical in all but one part. Each comprises a channel section 16, braced at each end by short, overlapping channel sections 17. A bracing block 18 having an attachment boss 19 and which is permanently or detachably fixed to the upper surface of the upper holder assembly 11 and the lower surface of the lower assembly 12 respectively, provides means whereby the test fixture 10 may be attached to a suitable device, such as an Instron tensile tester, for elongating specimens mounted in the test fixture 10.

A plurality of specimen jaws 20 rigidly fixed to a flat carrier plate 21 are rigidly fixed within the channel section 16 of the upper specimen holder assembly 11.

Similarly fixed within the channel section 16 of the lower assembly 12 are an equal plurality of identical specimen jaws 20 rigidly fixed to a stepped-wedge carrier plate 22.

These two carrier plates 21 and 22 constitute the only difference between the upper assembly 11 and the lower 12. The height of each of the steps of the stepped-wedge plate 22 is such as will result in a desired incremental difference in elongation between succeeding test specimens. For example, a step height of 0.2 inch would result in 5 percent increments of elongation, using test specimens with a 4 inch gage length. The stepped-wedge carrier plate 22 may be formed from a single block of material, as shown in the figure, or may be built up from a number of flat strips.

Neither the number nor the internal configuration of the specimen jaws 20, is, in itself, critical, the number being a matter of choice and the configuration being determined by the configuration of the specimens to be tested. Six jaws suitable for use with the standard JANAF "dogbone" tensile specimen, and which are available commercially, are shown for convenience.

The method of joining the various parts of the specimen holder assemblies is, likewise, not critical. Depending upon the material of construction used, the various parts may be joined by brazing, silver soldering, soft soldering, welding or analogous known processes. It is even possible to adhesively bond the various parts together using known high-strength adhesives, such as one of the many epoxy resin compositions commercially available.

In use, the strain endurance test fixture 10 is attached to a suitable straining device with the lower specimen holder assembly 12 held rigidly in place on the guide rods 13 and 14 by the two lower pairs of locking nuts 15 and with the upper specimen holder assembly 11 resting on the second pair of the locking nuts 15 at a distance above the lower assembly 12 appropriate for the insertion of test specimens. Selected test specimens (JANAF dogbones) are then placed between corresponding upper and lower specimen jaws 20. The uppermost pair of locking nuts 15 is adjusted to limit the separation of the upper and lower assemblies 11 and 12 to the desired maximum.

The straining device is then actuated, causing the upper and lower specimen holder assemblies 11 and 12 to separate. The specimen held in the pair of jaws having the greatest initial separation (the rightmost upper and lower jaws, as shown in the figure) begins to elongate first. After it has elongated by the step-wedge increment, the next specimen begins to elongate, followed in similar fashion by each succeeding specimen.

When the last specimen has been elongated the desired amount and the upper specimen holder assembly 11 has reached the limiting locking nuts 15, the straining device is stopped and the second pair of locking nuts 15 is run up until they contact the lower surface of the upper assembly 11, retaining the specimen holder assemblies 11 and 12 in their separated position with the test specimens elongated. The strain endurance test fixture 10 may now be removed from the straining device and set aside in a suitable rack or holder until one or more specimens fail or the test is otherwise concluded.

Alternatively, the maximum desired strain may be established by means of the tensile tester used to elongate the specimens held in the test fixture 10. In this case, the uppermost pair of locking nuts 15 is initially set only to limit the upward travel of the upper assembly 11 to the extent of the guide rods 13 and 14. When the desired elongation obtains, both the uppermost and the second pairs of locking nuts 15 are screwed into contact with the surfaces of the upper assembly 11, locking it in place on the guide rods 13 and 14.

While the present invention has been described by means of specific example and in a specific embodiment, it should not be limited thereto, for obvious modifications will occur to those skilled in the art without departing from the spirit of the invention or the scope of the subjoined claim.

Having thus described the invetnion, what is claimed as new and desired to be secured by Letters Patent is:

A strain endurance test fixture for elongating and holding a plurality of elastomeric test specimens at stepped increments of elongation comprising (a) a first specimen holder assembly comprising a first channel-shaped section having short channel-shaped sections inverted and positioned in overlapping relation to the opposite ends of said first channel-shaped section and a bracing block having at attachment boss thereon fixed to the upper surface of said first channel-shaped section and having a flat carrier plate mounted in said first channel-shaped section and providing specimen-retaining means for holding a plurality of test specimens at a common datum, (b) a second specimen holder assembly comprising a second channel-shaped section having short channel-shaped sections inverted and positioned in overlapping relation to the opposite ends of said second channel-shaped section and a bracing block having an attachment boss thereon fixed to the bottom surface of said second channel-shaped section and having a stepped-wedge-shaped carrier plate mounted in said second channel-shaped section and providing specimen-retaining means for holding an equal plurality of test specimens at stepped incremental distances from a common datum, (c) a pair of spaced guiding and retaining rods upon which said first and second specimen holder assemblies are slidably mounted, (d) a first locking means for adjustably locking said first and second specimen holder assemblies on said guiding and retaining rods and limiting the movement of said assemblies away from each other, and (e) a second locking means for adjustably retaining said first and second specimen holders on said guiding and retaining rods and for limiting the movement of said assemblies toward each other.

References Cited

UNITED STATES PATENTS

| | | | |
|---|---|---|---|
| 776,685 | 12/1904 | Post | 69—19.3 |
| 2,185,340 | 1/1940 | Howe | 74—95 X |
| 2,709,359 | 5/1955 | Koch et al. | 73—95 X |

JAMES J. GILL, *Acting Primary Examiner.*

J. W. MYRACLE, *Assistant Examiner.*